United States Patent
Dymetman et al.

(10) Patent No.: US 12,153,896 B2
(45) Date of Patent: Nov. 26, 2024

(54) METHOD AND SYSTEM FOR CONTROLLING DISTRIBUTIONS OF ATTRIBUTES IN LANGUAGE MODELS FOR TEXT GENERATION

(71) Applicant: Naver Corporation, Seongnam-si (KR)

(72) Inventors: Marc Dymetman, Grenoble (FR); Hady Elsahar, Grenoble (FR); Muhammad Khalifa, Grenoble (FR)

(73) Assignee: Naver Corporation (KR)

( * ) Notice: Subject to any disclaimer, the term of this patent is extended or adjusted under 35 U.S.C. 154(b) by 378 days.

(21) Appl. No.: 17/391,178

(22) Filed: Aug. 2, 2021

(65) Prior Publication Data
US 2022/0108081 A1 Apr. 7, 2022

(30) Foreign Application Priority Data

Oct. 1, 2020 (FR) ........................................ 2010054
Jun. 17, 2021 (EP) ........................................ 21305835

(51) Int. Cl.
*G06F 40/40* (2020.01)
*G06F 40/10* (2020.01)
(Continued)

(52) U.S. Cl.
CPC .............. *G06F 40/40* (2020.01); *G06F 40/10* (2020.01); *G06N 7/01* (2023.01); *G06N 20/00* (2019.01)

(58) Field of Classification Search
CPC .......... G06F 40/40; G06F 40/10; G06F 40/20; G06F 40/30; G06F 40/274; G06F 40/284;
(Continued)

(56) References Cited

U.S. PATENT DOCUMENTS

2012/0150532 A1* 6/2012 Mirowski ............... G06F 40/40
                                                704/E11.001
2021/0334299 A1* 10/2021 Sonntag ................. G06N 20/00

FOREIGN PATENT DOCUMENTS

CN            111460833           7/2020

OTHER PUBLICATIONS

Tetiana et al., "Global Autoregressive Models for Data-Efficient Sequence Learning", [1909.07063] Global Autoregressive Models for Data-Efficient Sequence Learning (arxiv.org), v2, September, p. 1-17. (Year: 2019).*

(Continued)

*Primary Examiner* — Leshui Zhang
(74) *Attorney, Agent, or Firm* — Michael J. Nickerson

(57) ABSTRACT

A method for generating a language model for text generation by receiving a pre-trained language model having attributes with existing probability distributions over the pre-trained language model; receiving at least one target constraint; the target constraint specifying an expectation of a target attribute over a language model that approximates the pre-trained language model; computing parameters of an energy based model by applying the target constraint to the pre-trained language model; obtaining samples from a reference policy; updating parameters of a target policy using the obtained samples and the energy based model; updating the reference policy with the target policy if the target policy is superior to the reference policy; and outputting the target policy as a target language model. The target language model is adapted to generate text with the target attribute over a probability distribution that approximates the desired probability distribution specified by the target constraint.

22 Claims, 5 Drawing Sheets

(51) Int. Cl.
    G06F 40/284    (2020.01)
    G06F 40/30     (2020.01)
    G06N 3/08      (2023.01)
    G06N 7/01      (2023.01)
    G06N 20/00     (2019.01)
(58) Field of Classification Search
    CPC ........ G06F 40/44; G06F 40/216; G06F 40/56;
            G06F 40/58; G06F 40/42; G06F 40/295;
                G06F 16/3329; G06F 16/35; G06F
                16/3344; G06F 16/353; G06F 9/5066;
                G10L 15/063; G06N 7/01; G06N 20/00;
                G06N 20/20; G06N 3/045; G06N 3/047;
                    G06N 3/08; G06N 3/006
    USPC .......... 704/1-9; 706/5, 6, 10, 12, 16, 17, 19,
            706/21, 25, 30, 60, 13, 14, 26, 55, 56, 61,
                                                    706/62
    See application file for complete search history.

(56)            References Cited

OTHER PUBLICATIONS

Yuntian Deng et al: "ResidualEnergy-Based Models for Text Generation", arxiv.org, Cornell University Library, 201 Olin Library Cornell University Ithaca, NY 14853. 2020.
Muhammad Khalifa et al: "A Distributional Approach to Controlled Text Generation", arxiv.org, Cornell University Library, 201 Olin Library Cornell University Ithaca, NY 14853. 2021.
EP21305835.7 an Unofficial European Search Report Dated Nov. 22, 2021. 2021.
Andor, Daniel, Chris Alberti, David Weiss, Aliaksei Severyn, Alessandro Presta, Kuzman Ganchev, Slav Petrov, and Michael Collins. "Globally Normalized Transition-Based Neural Networks." In Proceedings of the 54th Annual Meeting of the Association for Computational Linguistics (vol. 1: Long Papers), 2442-52. Berlin, Germany: Association for Computational Linguistics, 2016. 2016.
Belanger, David, and Andrew McCallum. "Structured Prediction Energy Networks," ICML, 2016. 2016.
Bordia, Shikha, and Samuel R. Bowman. "Identifying and Reducing Gender Bias in Word-Level Language Models." In Proceedings of the 2019 Conference of the North, 7-15. Minneapolis, Minnesota: Association for Computational Linguistics, 2019. 2019.
Brakel, Dzmitry Bahdanau Philemon, Kelvin Xu Anirudh Goyal, Aaron Courville, Ryan Lowe Joelle Pineau, and Yoshua Bengio. "An Actor-Critic Algorithm for Sequence Prediction," ICLR, 2017. 2017.
Brown, Tom B., Benjamin Mann, Nick Ryder, Melanie Subbiah, Jared Kaplan, Prafulla Dhariwal, Arvind Neelakantan, et al. "Language Models are Few-Shot Learners." ArXiv:2005.14165 [Cs], Jul. 22, 2020. 2020.
Caccia, Massimo, Lucas Caccia, William Fedus, Hugo Larochelle, Joelle Pineau, and Laurent Charlin. "Language Gans Falling Short," ICLR 2020. 2020.
Casella, George, Christian P. Robert, and Martin T. Wells. "Generalized Accept-Reject Sampling Schemes." In Institute of Mathematical Statistics Lecture Notes—Monograph Series, 342-47. Beachwood, Ohio, USA: Institute of Mathem Matching machine to human captions atical Statistics, 2004. 2004.
Chu, Eric, and Peter J Liu. "MeanSum : A Neural Model for Unsupervised Multi-Document Abstractive Summarization," ICML, 2019. 2019.
Dathathri, Sumanth, Andrea Madotto, Janice Lan, Jane Hung, Eric Frank, Piero Molino, Jason Yosinski, and Rosanne Liu. "Plug and Play Language Models: A Simple Approach to Controlled Text Generation," ICLR 2020. 2020.
Deng, Yuntian, Anton Bakhtin, Myle Ott, Arthur Szlam, and Marc'Aurelio Ranzato. "Residual Energy-Based Models for Text Generation" ICLR, 2020. 2020.

Graells-Garrido, Eduardo, Mounia Lalmas, and Filippo Menczer. "First Women, Second Sex: Gender Bias in Wikipedia." In Proceedings of the 26th ACM Conference on Hypertext & Social Media—HT '15, 165-74. Guzelyurt, Northern Cyprus: ACM Press, 2015. 2015.
Hinton, Geoffrey E. "Training Products of Experts by Minimizing Contrastive Divergence." Neural Computation, 2002. 2002.
Holtzman, Ari, Jan Buys, Li Du, Maxwell Forbes, and Yejin Choi. "The Curious Case of Neural Text DeGeneration" ICRL, 2020. 2020.
Holtzman, Ari, Jan Buys, Maxwell Forbes, Antoine Bosselut, David Golub, and Yejin Choi. "Learning to Write with Cooperative Discriminators." In Proceedings of the 56th Annual Meeting of the Association for Computational Linguistics (vol. 1: Long Papers), 1638-49. Melbourne, Australia: Association for Computational Linguistics, 2018. 2018.
Csiszar, Imre"l Divergence Geometry of Probability Distributions and Minimization Problems", Ann. Probab. 1975. 1975.
Art B. Owen "Importance Sampling" In Monte Carlo theory methods and examples, chapter 9, 2013. 2013.
Csiszar, Imre and Shields, Paul Information Theory and Statistics: A tutorial. 2004. 2004.
Jaques, Natasha, Asma Ghandeharioun, Judy Hanwen Shen, Craig Ferguson, Agata Lapedriza, Noah Jones, Shixiang Gu, and Rosalind Picard. "Way Off-Policy Batch Deep Reinforcement Learning of Implicit Human Preferences in Dialog." ArXiv:1907.00456 [Cs, Stat], Jul. 8, 2019. 2019.
Jaques, Natasha, Shixiang Gu, Dzmitry Bahdanau, José Miguel Hernández-Lobato, Richard E Turner, and Douglas Eck. "Sequence Tutor: Conservative Fine-Tuning of Sequence Generation Models with KL-Control," ICML, Sydney, Australia, PMLR 70, 2017. 2017.
Jaynes E. T. "Information theory and statistical mechanics" PhysRev, 1957. 1957.
Keskar, Nitish Shirish, Bryan McCann, Lav R. Varshney, Caiming Xiong, and Richard Socher. "CTRL: A Conditional Transformer Language Model for Controllable Generation." ArXiv:1909.05858 [Cs], Sep. 20, 2019. 2019.
Kim, Taesup, and Yoshua Bengio. "Deep Directed Generative Models with Energy-Based Probability Estimation." ArXiv:1606.03439 [Cs, Stat], Jun. 10, 2016. 2016.
Kusner, Matt J., and José Miguel Hernández-Lobato. "GANS for Sequences of Discrete Elements with the Gumbel-Softmax Distribution." ArXiv:1611.04051 [Cs, Stat], Nov. 12, 2016. 2016.
Lebret, Rémi, David Grangier, and Michael Auli. "Neural Text Generation from Structured Data with Application to the Biography Domain." In Proceedings of the 2016 Conference on Empirical Methods in Natural Language Processing, 1203-13. Austin, Texas: Association for Computational Linguistics, 2016. 2016.
LeCun, Yann, Sumit Chopra, Raia Hadsell, Marc'Aurelio Ranzato, and Fu Jie Huang. "A Tutorial on Energy-Based Learning," MIT Press. 2006. 2006.
Li, Jiwei, Michel Galley, Chris Brockett, Jianfeng Gao, and Bill Dolan. "A Diversity-Promoting Objective Function for Neural Conversation Models." In Proceedings of the 2016 Conference of the North American Chapter of the Association for Computational Linguistics: Human Language Technologies, 110-19. San Diego, California: Association for Computational Linguistics, 2016. 2016.
Li, Jiwei, Will Monroe, Alan Ritter, Dan Jurafsky, Michel Galley, and Jianfeng Gao. "Deep Reinforcement Learning for Dialogue Generation." In Proceedings of the 2016 Conference on Empirical Methods in Natura Language Processing, 1192-1202. Austin, Texas: Association for Computational Linguistics, 2016. 2016.
Li, Juncen, Robin Jia, He He, and Percy Liang. "Delete, Retrieve, Generate: A Simple Approach to Sentiment and Style Transfer." In Proceedings of the 2018 Conference of the North American Chapter of the Association for Computational Linguistics: Human Language Technologies, vol. 1 (Long Papers), 1865-74. New Orleans, Louisiana: Association for Computational Linguistics, 2018. 2018.
Liu, Chia-Wei, Ryan Lowe, Iulian Serban, Mike Noseworthy, Laurent Charlin, and Joelle Pineau. "How NOT to Evaluate Your Dialogue System: An Empirical Study of Unsupervised Evaluation Metrics for Dialogue Response Generation." In Proceedings of the

(56) References Cited

OTHER PUBLICATIONS

2016 Conference on Empirical Methods in Natural Language Processing, 2122-32. Austin, Texas: Association for Computational Linguistics, 2016. 2016.

Amari Shun-Ichi and Nagaoka Hiroshi Methods of Information Geometry. American Mathematical Society and Oxford University Press. 2000. 2000.

Robert Christian and Casella George. "Monte Carlo Statistical Methods" Springer Texts in Statistics. 2005, and in particular Chapter 7 entitled "The Metropolis-Hastings Algorithm" pp. 268. 320. 2005.

Nadeem, Moin, Anna Bethke, and Siva Reddy. "StereoSet: Measuring Stereotypical Bias in Pretrained Language Models." ArXiv:2004.09456 [Cs], Apr. 20, 2020. 2020.

Nielsen, Frank. "An Elementary Introduction to Information Geometry." Entropy 22, No. 10 (Sep. 29, 2020): 1100. 2020.

Parshakova, Tetiana, Jean-Marc Andreoli, and Marc Dymetman. "Distributional Reinforcement Learning for Energy-Based Sequential Models." ArXiv:1912.08517 [Cs, Stat], Dec. 18, 2019. 2019.

Parshakova, Tetiana, Jean-Marc Andreoli, and Marc Dymetman. "Global Autoregressive Models for Data-Efficient Sequence Learning." In Proceedings of the 23rd Conference on Computational Natural Language Learning (CoNLL), 900-909. Hong Kong, China: Association for Computational Linguistics, 2019. 2019.

Pasunuru, Ramakanth, and Mohit Bansal. "Reinforced Video Captioning with Entailment Rewards." In Proceedings of the 2017 Conference on Empirical Methods in Natural Language Processing, 979-85. Copenhagen, Denmark: Association for Computational Linguistics, 2017. 2017.

Paszke, Adam, Sam Gross, Francisco Massa, Adam Lerer, James Bradbury, Gregory Chanan, Trevor Killeen, et al. "PyTorch: An Imperative Style, High-Performance Deep Learning Library," NeurIPS 2019. 2019.

Paulus, Romain, Caiming Xiong, and Richard Socher. "A Deep Reinforced Model For Abstractive Summarization," ICLR, 2018. 2018.

Prates, Marcelo O. R., Pedro H. Avelar, and Luis C. Lamb. "Assessing Gender Bias in Machine Translation: A Case Study with Google Translate." Neural Computing and Applications, 2020. 2020.

Radford, Alec, Jeffrey Wu, Rewon Child, David Luan, Dario Amodei, and Ilya Sutskever. "Language Models are Unsupervised Multitask Learners," OpenAI Blog, 2019. 2019.

Ranzato, Marc'Aurelio, Y-Lan Boureau, Sumit Chopra, and Yann LeCun. "A Unified Energy-Based Framework for Unsupervised Learning," JMLR, 2007. 2007.

Ranzato, Marc'Aurelio, Sumit Chopra, Michael Auli, and Wojciech Zaremba. "Sequence Level Training with Recurrent Neural Networks." ArXiv:1511.06732 [Cs], May 6, 2016. 2016.

Schulman, John, Filip Wolski, Prafulla Dhariwal, Alec Radford, and Oleg Klimov. "Proximal Policy Optimization Algorithms." ArXiv:1707.06347 [Cs], Aug. 28, 2017. 2017.

See, Abigail, Stephen Roller, Douwe Kiela, and Jason Weston. "What Makes a Good Conversation? How Controllable Attributes Affect Human Judgments." In Proceedings of the 2019 Conference of the North, 1702-23. Minneapolis, Minnesota: Association for Computational Linguistics, 2019. 2019.

Sheng, Emily, Kai-Wei Chang, Premkumar Natarajan, and Nanyun Peng. "The Woman Worked as a Babysitter: On Biases in Language Generation." In Proceedings of the 2019 Conference on Empirical Methods in Natural Language Processing and the 9th International Joint Conference on Natural Language Processing (EMNLP-IJCNLP), 3405-10. Hong Kong, China: Association for Computational Linguistics, 2019. 2019.

Sheng, Emily, Kai-Wei Chang, Premkumar Natarajan, and Nanyun Peng. "Towards Controllable Biases in Language Generation." ArXiv:2005.00268 [Cs], Oct. 7, 2020. 2020.

Shetty, Rakshith, Marcus Rohrbach, Lisa Anne Hendricks, Mario Fritz, and Bernt Schiele. "Speaking the Same Language: Matching Machine to Human Captions by Adversarial Training." ArXiv:1703.10476 [Cs], Nov. 6, 2017. 2017.

Stanovsky, Gabriel, Noah A. Smith, and Luke Zettlemoyer. "Evaluating Gender Bias in Machine Translation." In Proceedings of the 57th Annual Meeting of the Association for Computational Linguistics, 1679-84. Florence, Italy: Association for Computational Linguistics, 2019. 2019.

Tambwekar, Pradyumna, Murtaza Dhuliawala, Lara J. Martin, Animesh Mehta, Brent Harrison, and Mark O. Riedl. "Controllable Neural Story Plot Generation via Reward Shaping." In Proceedings of the Twenty-Eighth International Joint Conference on Artificial Intelligence, 5982-88. Macao, China: International Joint Conferences on Artificial Intelligence Organization, 2019. 2019.

Tu, Lifu, Richard Yuanzhe Pang, Sam Wiseman, and Kevin Gimpel. "ENGINE: Energy-Based Inference Networks for Non-Autoregressive Machine Translation." ArXiv:2005.00850 [Cs], May 12, 2020. 2020.

Wallace, Eric, Shi Feng, Nikhil Kandpal, Matt Gardner, and Sameer Singh. "Universal Adversarial Triggers for Attacking and Analyzing NLP." In Proceedings of the 2019 Conference on Empirical Methods in Natural Language Processing and the 9th International Joint Conference on Natural Language Processing (EMNLP-IJCNLP), 2153-62. Hong Kong, China: Association for Computational Linguistics, 2019. 2019.

Williams, Ronald. J. Simple Statistical Gradient-Following Algorithms for Connectionist Reinforcement Learning. In Machine Learning, 1992. 1992.

Wolf, Thomas, Lysandre Debut, Victor Sanh, Julien Chaumond, Clement Delangue, Anthony Moi, Pierric Cistac, et al. "HuggingFace's Transformers: State-of-the-Art Natural Language Processing." ArXiv:1910.03771 [Cs], Jul. 13, 2020 2020.

Wu, Yonghui, Mike Schuster, Zhifeng Chen, Quoc V. Le, Mohammad Norouzi, Wolfgang Macherey, Maxim Krikun, et al. "Google's Neural Machine Translation System: Bridging the Gap between Human and Machine Translation." ArXiv:1609.08144 [Cs], Oct. 8, 2016. 2016.

Yang, Zichao, Zhiting Hu, Chris Dyer, Eric P Xing, and Taylor Berg-Kirkpatrick. "Unsupervised Text Style Transfer Using Language Models as Discriminators," NeurIPS 2018. 2018.

Zhu, Yaoming, Sidi Lu, Lei Zheng, Jiaxian Guo, Weinan Zhang, Jun Wang, and Yong Yu. "Texygen: A Benchmarking Platform for Text Generation Models." ArXiv:1802.01886 [Cs], Feb. 6, 2018 2018.

Ziegler, Daniel M., Nisan Stiennon, Jeffrey Wu, Tom B. Brown, Alec Radford, Dario Amodei, Paul Christiano, and Geoffrey Irving. "Fine-Tuning Language Models from Human Preferences." ArXiv:1909.08593 [Cs, Stat], Jan. 8, 2020. 2020.

\* cited by examiner

A) Compute Energy Based Model (EBM) $P$

A.1) compute parameters $\lambda$ of EBM

B) Compute Target Language Model $\pi_\theta$

B.1) initialize target policy $\pi$ and reference policy $q$ with the pre-trained language model $a$ B.2) repeat B.2.A and B.2.B until target policy $\pi$ converges with target contraints $\bar{\phi}$:

B.2.A) for an episode:

B.2.A.1) sample an $x$ from reference policy $q(\cdot)$

B.2.A.2) compute weights $\theta \leftarrow \theta + \alpha^{(\theta)} \frac{P(x)}{q(x)} \nabla_\theta \log \pi_\theta(x)$ using distributional policy gradient B.2.A.3) update target policy $\pi$ with computed weights $\theta$ B.2.B) if target policy $\pi$ for the episode is superior to reference policy $q$:

B.2.B.1) update reference policy $q$ with target policy $\pi$

B.3) provide target target policy $\pi$ as target language model $\pi_\theta$

FIGURE 3

| # | Aspect | Desired | Before | After |
|---|---|---|---|---|
| | Single Distributional constraint | | | |
| 1 | Female | 50% | 07.4% | 36.7% |
| | Multiple distributional constraints | | | |
| 2 | art | 40% ↑ | 10.9% | ↑ 31.6% |
| | science | 40% ↑ | 01.5% | ↑ 20.1% |
| | business | 10% ↓ | 10.9% | ↓ 10.2% |
| | sports | 10% ↓ | 19.5% | ↓ 11.9% |
| | Hybrid constraints | | | |
| 3 | Female | 50% | 07.4% | 31.9% |
| | sports | 100% | 17.5% | 92.9% |
| 4 | Female | 50% | 07.4% | 36.6% |
| | art | 100% | 11.4% | 88.6% |
| 5 | Female | 50% | 07.4% | 37.7% |
| | business | 100% | 10.1% | 82.4% |
| 6 | Female | 50% | 07.4% | 28.8% |
| | science | 100% | 01.2% | 74.7% |

FIGURE 4

METHOD AND SYSTEM FOR CONTROLLING DISTRIBUTIONS OF ATTRIBUTES IN LANGUAGE MODELS FOR TEXT GENERATION

PRIORITY INFORMATION

Pursuant to 35 U.S.C. § 119 (a), this application claims the benefit of earlier filing date and right of priority to European Patent Application Number EP 21305835, filed on Jun. 17, 2021, which claims priority from French Patent Application, Serial Number 2010054, filed Oct. 1, 2020. The entire content of European Patent Application Number EP 21305835 is hereby incorporated by reference.

Pursuant to 35 U.S.C. § 119 (a), this application claims the benefit of earlier filing date and right of priority to French Patent Application, Serial Number 2010054, filed Oct. 1, 2020. The entire content of French Patent Application, Serial Number 2010054 is hereby incorporated by reference.

BACKGROUND

A machine learning (ML) based language model (LM) is a natural language processing (NLP) model that may be used for text generation, for instance to predict the next word (or token) in a sentence (or sequence of tokens).

Neural language models, pretrained on huge amounts of text, have become pre-eminent in natural language processing, producing texts of unprecedented quality. Controlled text generation steers or controls the text generation process in order to satisfy certain desiderata. Controlled text generation from pre-trained language models may be implemented to avoid toxic content, prevent certain demographic biases or steer generations towards a certain topic or style. For instance, if a language model is to be used to generate reading materials for kids, controlled text generation should guide the output stories to be safe, educational and easily understood by children.

Conditioning text generation to target attributes may be achieved using different techniques including: training an original language model using data with desired text attributes, changing the text generated by a language model in a post-processing manner towards desired target attributes, or fine tuning a pre-trained language model to generate text with desired target attributes.

Language models (LMs), in a strict sense, such as GPT-2 and GPT-3, or in an extended sense, such as BERT, pre-trained on large datasets of text, are well known in natural language processing. Such pre-trained language models are typically seen as stores of generic knowledge that can be used for downstream tasks through fine-tuning, often done by providing a small amount of task-specific training data and extending or modifying parameters of pre-trained language models. One limitation with existing fine-tuning methods is that they risk the resulting model incurring catastrophic forgetting, which may result in a lesser quality model than the pre-trained language model. Another limitation is that existing fine-tuning methods apply pointwise control over attributes (i.e., absolute; focusing on the quality of each individual output) with little distributional control that could ensure desired collective statistical properties.

There is consequently a need for an improved method for computing a pre-trained language model that addresses these limitations.

BRIEF DESCRIPTION OF THE DRAWINGS

The drawings are only for purposes of illustrating various embodiments and are not to be construed as limiting, wherein:

FIG. 3 sets forth the illustrated in FIG. 2;

FIG. 4 illustrates different constraints for controlling distributions of attributes in language models for text generation.

DETAILED DESCRIPTION

Described herein are systems and methods for ranking items in relationship with their relevance to a user. For purposes of explanation, numerous examples and specific details are set forth in order to provide a thorough understanding of the described embodiments.

The illustrative embodiments will be described with reference to the drawings wherein like elements and structures are indicated by like reference numbers.

Figure 1:
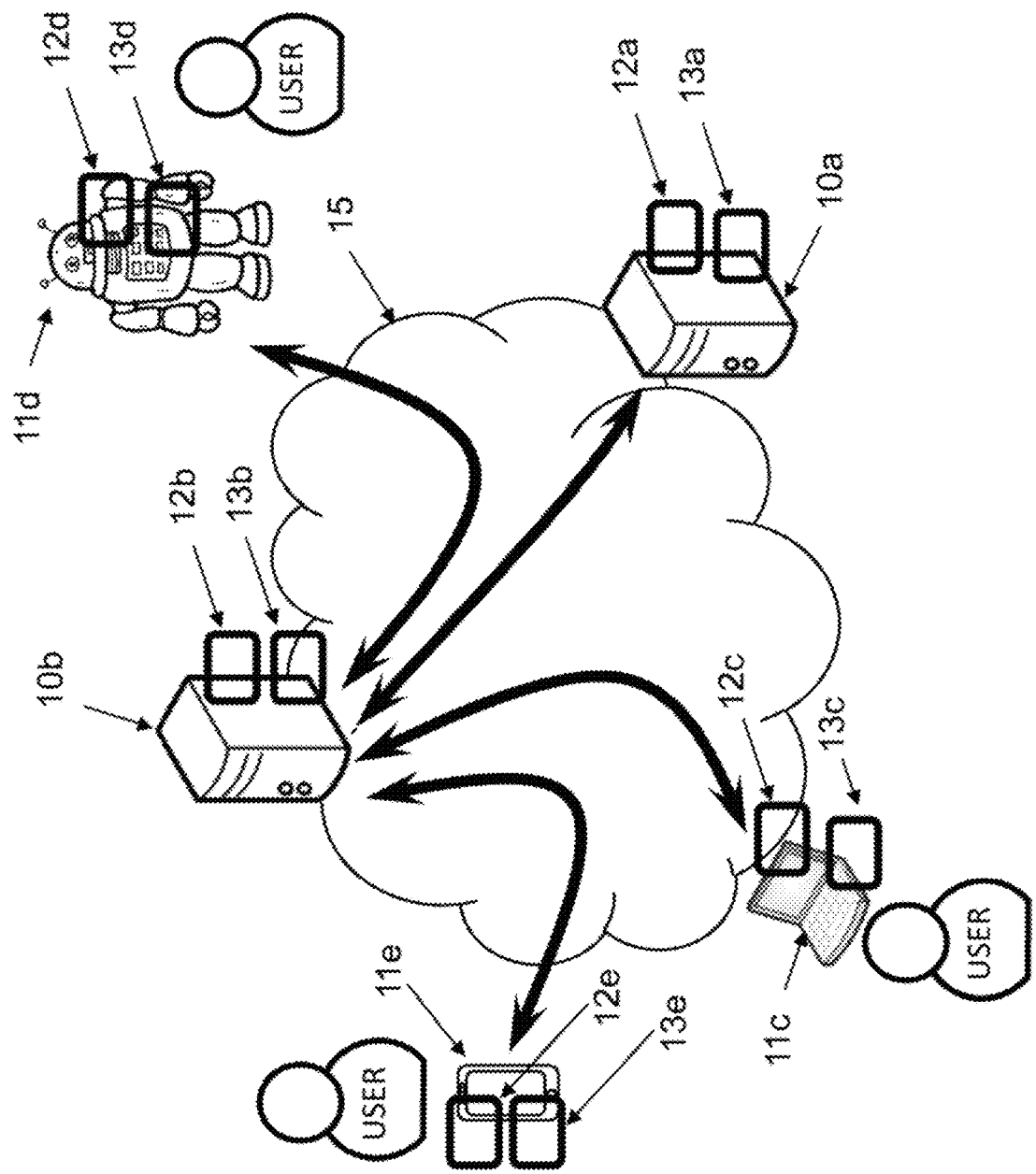
FIG. 1 illustrates an example of architecture in which the methods described below are performed.

The disclosed methods for controlling distributions of attributes in language models for text generation may be implemented within a system architecture such as that illustrated in FIG. 1, which includes a first server 10a and a second server 10b. In one embodiment, the first server 10a is a dataset server for storing a training dataset or a pre-trained machine learning language model stored in memory 13a and the second server 10b is a training server for implementing a method for obtaining a target machine learning language model satisfying certain conditions stored in memory 13b.

The servers 10a and 10b are typically remote computer equipment connected to an extended network 15 such as the Internet for data exchange. The system architecture in FIG. 1 advantageously comprises one or more items of client equipment, which may be any workstation 11c, robot 11d, or mobile device 11e (which are also connected to network 15); preferably separate from the servers 10a, 10b but possibly being merged with one and/or the other thereof. Each server 10a, 10b and client equipment 11c, 11d, 11e comprises, respectively, data processing means 12a, 12b, 12c, 12d, 12e of processor type, and optionally storage means 13a, 13b, 13c, 13d, 13e such as a computer memory (e.g. a hard disk).

The operators (i.e., "users") of client equipment 11c, 11d, 11e are typically "clients" in the commercial meaning of the term, of the service provider operating the first and/or second servers 10a, 10b. Client equipment 11c, 11d, 11e communicate over network 15 with server 10b for generating text using the machine learning target language model (e.g., by predicting the next word (or token) in a sentence (or sequence of tokens)).

A computer-implemented method for exploiting a pre-trained language model $a(x)$ (e.g., the autoregressive model GPT-2) is disclosed herein for obtaining a target language model $p(x)$ satisfying certain conditions. For example, the target $p(x)$ may be fine-tuned to avoid demographic biases by orienting the pre-trained language model $a(x)$ towards generating texts in that area. This computer-implemented method comprises receiving a pre-trained language model a(x) having attributes with existing probability distributions over the pre-trained language model, and receiving at least one target constraint, the target constraint specifying an expectation (such as a desired probability distribution) of a target attribute over a language model that approximates the pre-trained language model (i.e., the target language model).

The difficulty of imposing such conditions over the target language model p(x) varies. Conditioning the target language model p(x) to generate text has varying levels of difficulty; for example, conditions that impose a prefix to an individual text are easier than conditions that operate at the level of an individual text that are pointwise, which are in turn easier than conditions that provide a distributional aspect over a collection of texts.

Conditions that are pointwise are used for generating sentences that meet a certain 0/1 condition that is not of a "prefix type"; for example, sentences that are detected by some binary classifier as speaking of climate-change consequences. Conditions that have a distributional aspect are not binary; for example, texts concerning climate-change consequences in a pre-trained language model a(x) may yield a distribution where 80% concern countries in the northern hemisphere and 20% concern countries in the southern hemisphere, but the desired distribution in the target language model p(x) is instead 40% and 60%, respectively.

One method for evaluating the adequacy of a probability distribution p(x) to one's objectives involves estimating the values (i.e., "moments") of the expectations relative to a distribution of a few well-chosen random variables (i.e., "attributes") and checking whether these estimated values fit original expectations. This process is wide-ranging; it can also be applied (as few other methods can) to testing the hypothesis that two random samples come from the same distribution, a general form of which is known under the term Maximum Mean Discrepancy.

In accordance with the methods disclosed herein, this process is reversed, and its random variables and expectations are used as explicit first-class objectives in the design of a target-controlled distribution over textual sequences. However, as stated in this form, the approach underspecifies the target distribution p(x) because many different distributions, especially on high-dimensional data such as sequences, can fit a finite number of moment constraints.

The disclosed method provides one way to isolate a target distribution p(x) which involves (i) providing a "prior" distribution $p_{prior}$, which may be a distribution that is a best guess without specific "expectations", and (ii) minimizing a divergence, for instance the KL (Kullback-Leibler) divergence (i.e., relative entropy) $D_{KL}(p, p_{prior})$, between the target distribution p(x) and the prior distribution $p_{prior}$ while respecting the moment constraints, thereby measuring the difference between the probability distributions.

Hence, in accordance with the disclosed method, controlled text generation is performed by resolving a constraint satisfaction problem over the probability distribution p representing the desired target language model. Namely, the constraint satisfaction problem requires the expectations ("moments") relative to p of certain output features to have specific values; this permits for instance to condition all outputs to speak about sports (a pointwise constraint), and 50% of them to mention female characters (a distributional constraint).

Additionally, the methods disclosed herein require p to have a minimal divergence from the prior distribution. This has the effect that p inherits favorable linguistic qualities from the prior distribution.

In one embodiment, $p_{prior}$=a(x), which amounts to an ignorant prior distribution, that is, such a distribution would be the uniform distribution over the sample space, which would correspond to the well-known Maximum Entropy technique (MaxEnt), a formal way of staying maximally noncommittal to events while satisfying the expectation constraints. In the general case of a non-uniform distribution, this approach can be seen as a Generalized Maximum Entropy principle, an approach which enjoys remarkable mathematical properties that include: (a) The target probability distribution p belongs to the exponential family determined by a and the vector $\phi(x)=(\phi_1(x), \ldots, \phi_k(x))$ of attributes whose moments are constrained. In other words, the target probability distribution p can be expressed in the form p(x)=1/Z P(x), where P(x)=a(x) exp $\langle \lambda, \phi(x) \rangle$, for some vector of parameters $\lambda=(\lambda_1, \ldots, \lambda_k)$, and where Z is a normalization constant; and (b) The moment constraints then uniquely determine the value of the parameter vector $\lambda$, which can be efficiently obtained through a simple optimization procedure, leading to an explicit representation of P, where P is an instance of an Energy Based Model, namely an unnormalized distribution, and the value of Z is only determined implicitly by the representation P.

In accordance with the methods described herein, the energy based model representation P is computed to define the probability distribution p that satisfies the target constraints. However, even if the normalization constant Z (where p(x)=P(x)/Z) were known (i.e., if the probability distribution p was normalized), the ability to compute the target distribution p(x) exactly on each individual x does not imply the ability to produce probabilistic samples from p.

Figure 2:
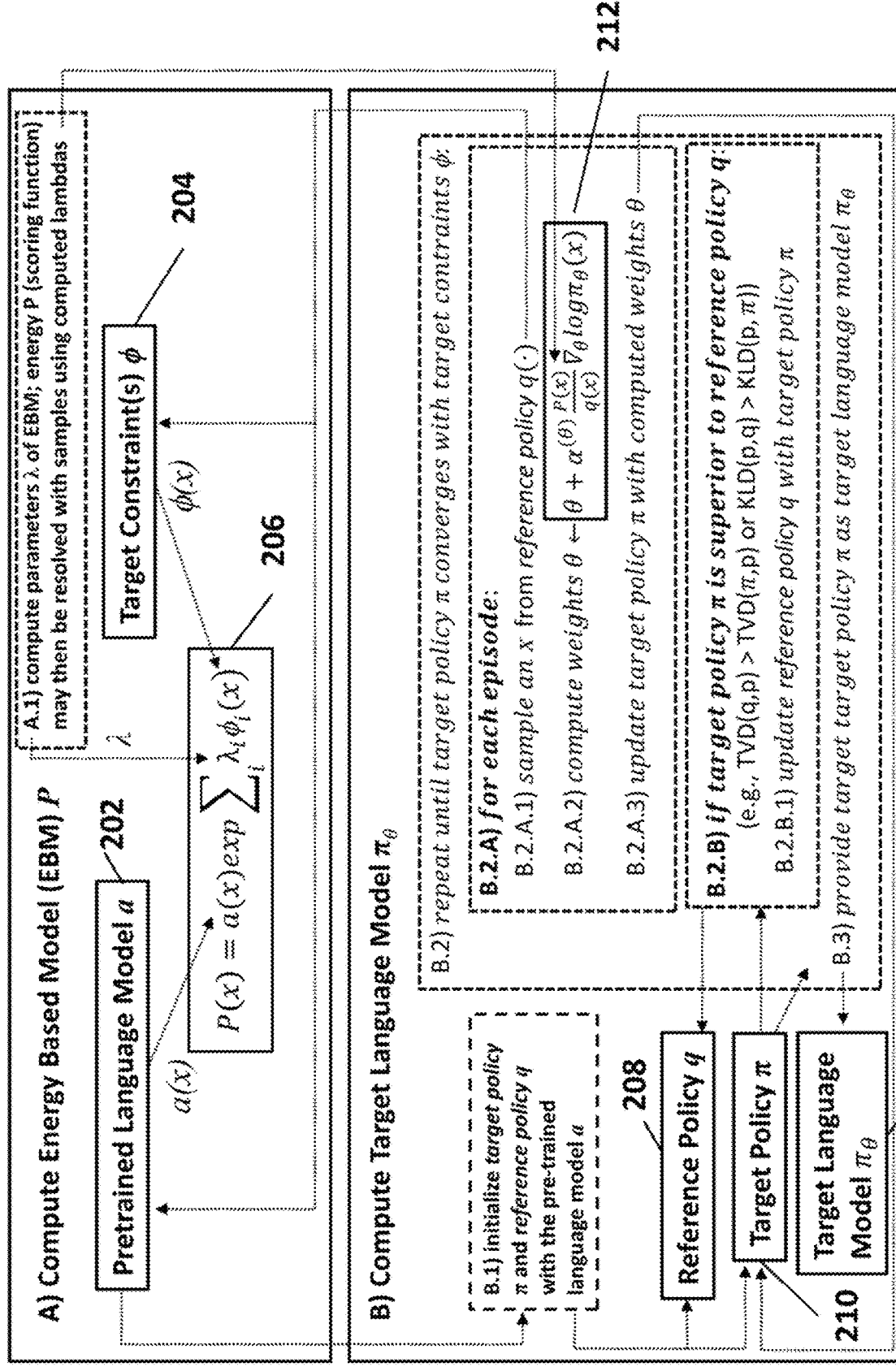
FIG. 2 illustrates the interaction of computational elements and the process for creating the computational elements for controlling distributions of attributes in language models for text generation.

In accordance with the methods described herein, FIGS. 2 and 3 illustrate exemplary embodiments, where FIG. 2 illustrates the interaction of computational elements and the process for creating the computational elements, and FIG. 3 sets forth the process of FIG. 2.

Generally, the exemplary method shown in FIGS. 2 and 3 includes a first processing group (A) for computing an explicit form of an energy based model energy based model P 206 using a pre-trained language model 202 and target constraints 204, and a second processing group (B) for computing a target language model 214 by training an autoregressive policy to approximate the distribution determined by the energy based model 206 computed in the first processing group (A).

Initially as part of the first processing group (A), the pre-trained language model 202 is received along with the target constraints 204. The pre-trained language model 202 may be a pre-existing language model or a new language model that is trained using an available dataset. Examples of pre-existing language models are the GPT-2 and GPT-3 autoregressive language models.

The target constraints 204 may comprise one or more pointwise constraints, distributional constraints or hybrid constraints that are desired of probability distributions of attributes over the target language model 214 in place of probability distributions of such attributes over the pre-trained language model 202. Pointwise constraints yield absolute results (e.g., text generated from the target language model is to concern sports). Each target constraint may be a set of two or more constraints.

FIG. 4 illustrates examples of different constraints for controlling distributions of attributes in language models for text generation: pointwise constraints (e.g., text generated from the target language model is to concern sports 100% of the time), distributional constraints (e.g., text generated from the target language model is to concern the sport of tennis 25% of the time and the sport of fencing 5% of the time) and hybrid constraints (i.e., a combination of pointwise and distributional constraints; e.g., the pointwise constraint of sports, with 25% tennis and 5% fencing) that may be applied using the present methods for conditioning text generation of the pre-trained language model 202 of FIG. 2 that is imbalance or biased towards one outcome over another. Such imbalance may result from imbalanced training data.

In example 1 in FIG. 4, a distributional aspect of 50% female is desired in place of the 7.4% in the pre-trained language model 202 of FIG. 2. In one experiment using the methods set forth herein, the target language model 214 of FIG. 2 achieves a distributional quality of the female aspect of 36.7%.

The first processing group (A) comprises computing parameters of an Energy Based Model, energy based model, by applying the target constraints to the pre-trained language model. In this first processing group (A), the energy based model energy based model P may be given by:

$$P(x) = a(x) \exp \Sigma_i \lambda_i \phi_i(x),$$

where $a(x)$ corresponds to the pre-trained model 202 of FIG. 2, $\phi_i(x)$ corresponds to the target constraints 204 of FIG. 2, and corresponds to parameters of the energy based model 206 of FIG. 2. In the first sub-processing group (A.1), the parameters $\lambda_i$ of the energy based model 206 of FIG. 2 are computed using the pre-trained language model 202 of FIG. 2 and the target constraints 204 of FIG. 2. Using the computed parameters $\lambda_i$ of the energy based model 206 of FIG. 2, energy P (a scoring function) may be resolved with samples.

In the second processing group (B), a target language model 214 of FIG. 2 is computed using the energy based model 206 of FIG. 2 in the first processing group (A). In the first processing sub-group (B.1), a reference policy 208 of FIG. 2 and a target policy 210 of FIG. 2 are obtained and may be initialized using the pre-trained language model 202 of FIG. 2. Those skilled in the art will recognize that the reference policy 208 of FIG. 2 and the target policy 210 of FIG. 2 may be initialized using other defaults.

In the second processing sub-group (B.2), sub-group (B.2.A) and sub-group (B.2.B) are repeated until the target policy 210 of FIG. 2 converges with the target constraints 204 of FIG. 2. In one embodiment, convergence is achieved when the target policy 210 of FIG. 2 converges within a threshold of the implicit probability distribution represented by the energy based model 206 of FIG. 2.

Once convergence is achieved in the second processing sub-group (B.2), the target policy 210 of FIG. 2 is provided for output as the target language model 214 of FIG. 2 in the third processing sub-group (B.3), where target language model 214 of FIG. 2 that is provided for output is conditioned for text generation with a distribution of the target attributes that matches (i.e., approximates) the expectations specified by the target constraints.

In sub-group (B.2.A) of the second processing sub-group (B.2), samples from the reference policy are obtained and parameters of the target policy are updated using the obtained samples and the energy based model 206 of FIG. 2. Updating the parameters of the target policy may comprise computing a distributional policy gradient using the obtained samples and the energy based model 206 of FIG. 2.

For instance, an x (e.g., a sentence) is sampled at step (B.2.A.1) from the reference policy q that is scored from the pre-trained language model 202 of FIG. 2 and the target constraints 204 of FIG. 2. At step (B.2.A.2), weights θ of the target policy 210 of FIG. 2 may be computed using a distributional policy gradient 212 of FIG. 2 defined as:

$$\theta \leftarrow \theta + \alpha \frac{P(x)}{q(x)} \nabla_\theta \log \pi_\theta(x),$$

where $P(x)$ is the energy based model 206 of FIG. 2, q is the reference policy, $\pi_\theta$ is the target policy 210 of FIG. 2, θ are weights of the target policy 210 of FIG. 2 and α is a learning rate between zero and one. The weights θ of the target policy 210 of FIG. 2 computed using the distributional policy gradient 212 of FIG. 2 are used at step (B.2.A.3) to update parameters of the target policy 210 of FIG. 2.

In sub-group (B.2.B), when the target policy 210 of FIG. 2 is superior to the reference policy 208 of FIG. 2, the reference policy 208 of FIG. 2 is updated with the target policy 210 of FIG. 2. The target policy 210 of FIG. 2 may be considered as superior to the reference policy 208 of FIG. 2 when the distance between the target policy 210 of FIG. 2 and the implicit probability distribution represented by the energy based model 206 of FIG. 2 is smaller than the distance between the reference policy 208 of FIG. 2 and the implicit probability distribution represented by the energy based model 206 of FIG. 2. More formally, this may be achieved in two example embodiments when: (a) TVD(p, $\pi_\theta$)<TVD(p,q), where each distance is calculated as a TV (Total Variation) distance (TVD); or (b) KLD(p,$\pi_\theta$)<KLD (p,q), where each distance is calculated as a KL (Kullback-Leibler) divergence (KLD) because the probability p is unknown, an approximation is calculated that relies on the value of P.

Advantageously, embodiments of the method in FIGS. 2 and 3 to control text generation from the pre-trained language model formulate the problem as one of satisfying constraints, where the constraints are specified in terms of expectations of certain attributes, and where large deviations from the pre-trained model are avoided by minimizing divergence with respect to the pre-trained model. A further advantage of formulating the problem as one of satisfying constraints is that both pointwise and distributional properties may be imposed, where pointwise constraints are properties of each individually generated sequence, and distributional constraints are properties of generated sequences that may be viewed collectively.

The following is a formal mathematical description of the method set forth in FIGS. 2 and 3 for exploiting a generic pre-trained language model $a(x)$ for obtaining a target language model $p(x)$ satisfying certain desiderata. Denoted herein are a finite set X corresponding to the set of all sequences x ("sentences" or "paragraphs") of length bounded by some constant $L_{max}$, the initial generic model a, the desired target model p and the probability of x according to a (respectively p) $a(x)$ (respectively $p(x)$). For simplicity, only bounded sequences are considered, in order to keep X finite. By taking $L_{max}$ sufficiently large, the probability mass of a over X is assumed to be negligibly different from 1.0.

The approach set forth herein then consists in expressing the desiderata through "moment-matching" constraints on the desired values $\bar{\mu}_i$ of the expectations (i.e., moments) $\bar{\mu}_i =$ $\mathbb{E}_{x \sim p} \phi_i(x)$ of certain predefined real-valued feature functions $\phi_i(x)$, for $i \in \{1, \ldots, k\}$.

For example, a target language model with a desired pointwise constraint of climate change and distributional constraints of mentioning Northern countries 40% of the time and Southern countries 60% of the time, can be expressed by using three binary attributes, $\phi_1(x)=1$ iff x is classified as speaking about climate, $\phi_2(x)=1$ (respectively $\phi_3(x)=1$) iff x mentions a Northern (respectively Southern) country. Then the constraints take the following form: $\mu_1 = \mathbb{E}_{x \sim p}\phi_1(x)=1.0$; $\mu_2 = \mathbb{E}_{x \sim p}\phi_2(x)=0.4$; $\mu_3 = \mathbb{E}_{x \sim p}\phi_3(x)=0.6$.

The first (pointwise) constraint implies that each individual x has to speak about climate (otherwise $\mu_1$ could not reach it maximum value 1.0), the second and third (distributional) constraints imply that 40% of the x's have to mention a Northern country (respectively 60% a Southern country). Note that as stated here, the two distributional constraints are not exclusive, but this could easily be enforced by adding a fourth constraint forbidding the simultaneous presence of both mentions.

Expectation constraints are quite powerful, but they have two drawbacks: (i) they do not explicitly refer to the initial model a, and (ii) they under-specify p. Concerning the first point, this method seeks to satisfy the constraints in a way that "minimally" deviates from a. One method to do this is to look for a p such that: $p = \arg\min_{q \in C} D_{KL}(q, a)$, where $D_{KL}(q,a)$ is the KL divergence between q and a, and C is the set of all distributions q over X that satisfy the three constraints for the example above. Under mild conditions, the distribution p exists and is unique, thus also solving the second drawback. For a general a, this equation represents a Generalized MaxEnt model.

To recap this approach formally, consider a finite set X, a distribution a over X subject to $a(x)>0$, $\forall x \in X$, and real functions $\phi_1, \ldots, \phi_k$ over X For $i \in \{1, \ldots, k\}$, there are constraints $\mu_i = \overline{\mu}_i$ on distributions q over X, where $\mu_i = \mathbb{E}_{x \sim p_k} \phi_i(x)$, and the set of distributions satisfying these constraints is denoted by C. In accordance with the methods set forth herein, a $q \in C$ is sought that minimizes $D_{KL}(q,a)$, and such a q, if it exists, is denoted by p.

Under the assumption that $C \neq \emptyset$, the following Propositions are proved in Chapter 3, *Information theory and statistics: a tutorial*, by Csiszar and Shields of the publication entitled "Foundations and Trends™ in Communications and Information Theory", 2004.

Proposition 1—There exists a unique solution p to the problem above. This p has the following "exponential family" form:

$$p(x) = \begin{cases} Ka(x)\exp\sum_i \lambda_i \phi_i(x) & \text{if } x \in X_C \\ 0 & \text{otherwise} \end{cases},$$

where the $\lambda_i$'s are called the "natural parameters" of the exponential family and $K>0$ is a normalization constant. $X_C = \{x \in X : \exists q \in C \text{ subject to } q(x)>0\}$ is the "support set" associated with C, that is, the set of all x's that are "accepted" by at least one distribution in C (by the assumption $C \neq \emptyset$, this set is not empty).

Let us define $P(x) \doteq a(x)\mathbb{I}[x \in X_C]\exp \Sigma_i \lambda_i \phi_i(x)$. P is an Energy Based Model that is an unnormalized probability distribution, and $p(x) \propto P(x)$ is its normalized version, where $Z \doteq \Sigma_{x \in X} P(x) = 1/K$ is denoted as the partition function of P, and where $p = Z^{-1}P$.

In the general hybrid case, with both pointwise and distributional constraints, one may wish to avoid the need to explicitly determine the support $X_C$. This is possible, due to the following proposition, adapted from Csiszar and Shields.

Proposition 2—p can be approximated to an arbitrary precision $\in$ by a distribution $p_\in$ of the form $p(x) \propto a(x)\exp \Sigma_i \lambda_i \phi_i(x)$, for appropriate values of the $\lambda_i$'s.

This property means that, even if the support $X_C$ is a proper subset of X, it is still possible to approximate p by a strict exponential family expression, but where, possibly, some of the $\lambda$'s may tend to arbitrary large positive or negative values. From an application standpoint, this property can be used to avoid explicitation of $X_C$ and just clip some of the $\lambda$'s if they cross a large positive or negative threshold.

The connection between expectation constraints and exponential families is a core starting point for the field of "Information Geometry" (for background, see the article by Frank Nielsen, entitled "An elementary introduction to information geometry" published on arXiv as arXiv: 1808.0827, 2018), which studies general information divergences in relation with differential geometry. An illustration of this viewpoint applied to this problem is provided in FIG. 5, which provides C a manifold of all the possible distributions satisfying target constraints $\phi(x)$, where a(x) is the pre-trained language model.

Figure 5:
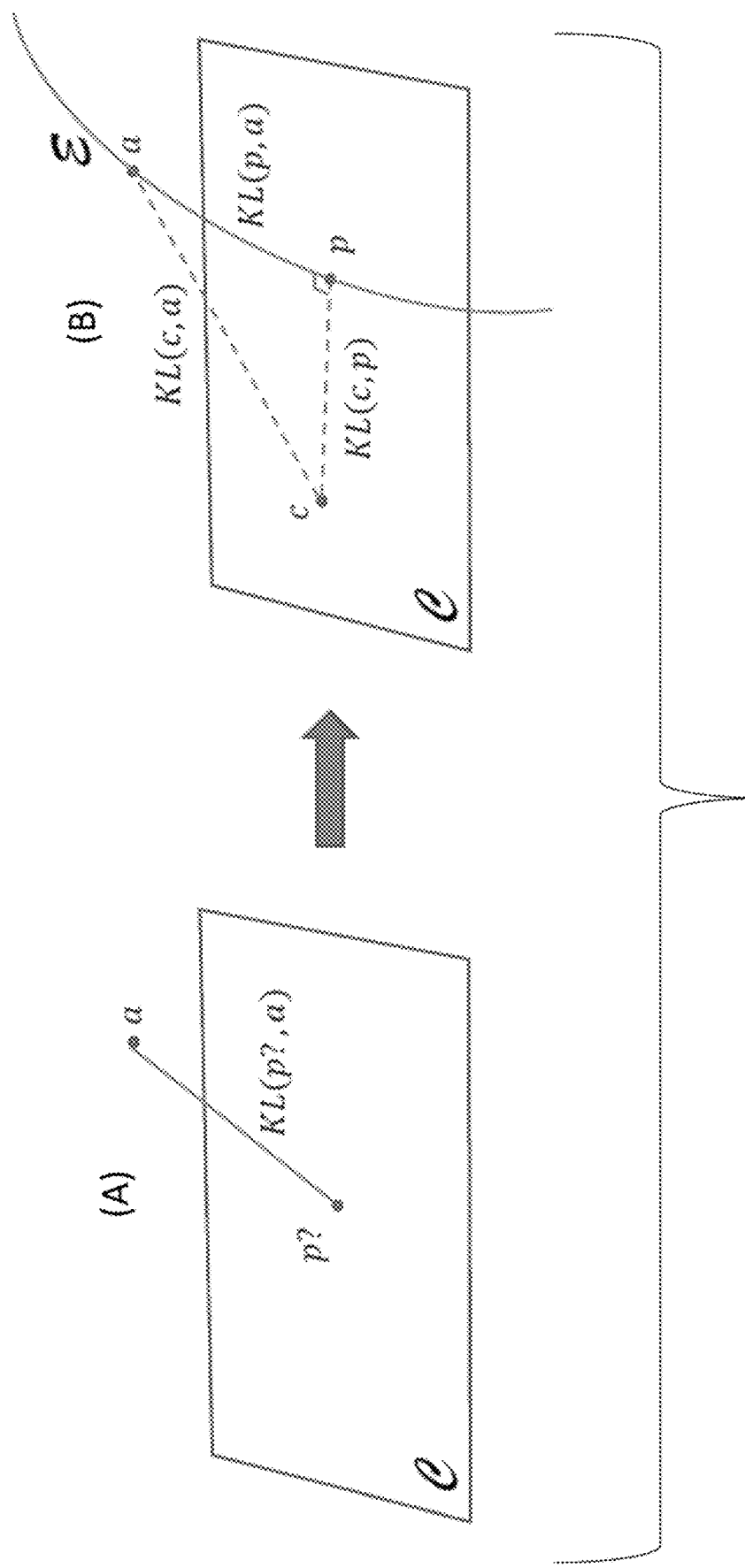
FIG. 5 illustrates an information geometry perspective of how the target language model is made to deviate as little as possible from the pre-trained language model.

The Generalized MaxEnt specification ((A) of FIG. 5) is looking for a distribution p that lies on the moment constraints manifold C and that minimizes the forward KL $D_{KL}(p,a)$. The solution ((B) of FIG. 5) is provided by Information Geometry: (i) build the exponential family $\varepsilon$ determined by a and $\phi$, (ii) p lies at the intersection between C and $\varepsilon$, (iii) for any distribution c satisfying the constraints, the "Pythagorean identity" holds: $D_{KL}(c,a) = D_{KL}(c,p) + D_{KL}(p,a)$; in particular p is unique.

Consider the situation of concrete moment constraints $\mathbb{E}_{x \sim p}\phi(x) = \overline{\mu}$. These properties lead to finding a parameter vector A such that $$E_{x \sim p_\lambda} \phi(x) = \overline{\mu}, \text{ where}$$

$$p_\lambda(x) \doteq \frac{P_\lambda(x)}{Z_\lambda}, P_\lambda(x) = a(x)\exp\langle\lambda, \phi(x)\rangle, Z_\lambda = \sum_x P_\lambda(x).$$

In order to address this problem, a large number N of sequences $x_1 \ldots x_i \ldots x_N$ are sampled from a, that define "importance weights":

$$w_i(\lambda) \doteq \frac{P_\lambda(x_i)}{a(x_i)} = \exp\langle\lambda, \phi(x_i)\rangle$$

and $\mu(\lambda) = \mathbb{E}_{x \sim p_\lambda}\phi(x)$ is estimated by SNIS (Self Normalized Importance Sampling):

$$\mu(\lambda) \approx \hat{\mu}(\lambda) = E_{x \sim p_\lambda} \frac{\sum_i w_i(\lambda)\phi(x_i)}{\sum_i w_i(\lambda)}.$$

To solve $\lambda$ in the equation above, $\hat{\mu}(\lambda) = \overline{\mu}$ is addressed by SGD (Stochastic Gradient Descent) over the objective $\min \|\overline{\mu} - \hat{\mu}\|_2^2$. (According to the formal properties previously discussed, μ(λ) can approximate $\bar{\mu}$ arbitrarily close, and on the other hand it is know from SNIS theory that with increasing N, $\hat{\mu}(\lambda)$ will become arbitrarily close to μ(λ).) At the end of this process, an estimated value for the parameters λ is obtained, and an energy based model representation $P_\lambda(x)$ =a(x)exp<λ,φ($x_i$)>. Hereinafter, it will be assumed that the obtained value for λ is fixed and left out of the notation, and simply use P and p respectively for $P_\lambda$ and $p_\lambda$; the notation $Z=\Sigma_x P(x)$ for the partition function of P is also used herein.

The energy based model representation just obtained for P defines the optimal $p=Z^{-1}P$ unambiguously, an intermediary step in the solution of this problem. From it ratios of the form p(x)/p(x') can be computed for two sequences x, x'. Without knowing Z, p(x) cannot be computed and, even with such knowledge, samples from p cannot be produced.

This problem is typical of energy based models at large: they provide a rich and flexible mechanism for specifying models, but they leave a gap between representation and exploitation. A range of techniques, from sophisticated Markov Chain Monte-Carlo (MCMC) approaches (especially for continuous models in vision) to contrastive learning techniques, have been developed for bridging this gap.

One technique that is well-adapted to objectives here, namely sampling from a sequential energy based model that includes an autoregressive component a(x), are the Distributional Policy Gradient approaches disclosed in co-pending U.S. patent application Ser. No. 17/018,754, entitled "Methods and Systems For Producing Neural Sequential Models Field". The entire content of U.S. patent application Ser. No. 17/018,754 is hereby incorporated by reference.

An objective of the Distributional Policy Gradient approaches is to obtain an autoregressive policy $\pi_\theta$ that approximates p. Approximation is formalized in terms of making the cross-entropy CE(p,$\pi_\theta$) in the following equation as small as possible:

$$CE(p,\pi_\theta)=-\Sigma_x p(x)\log \pi_\theta(x)$$

which is equivalent to minimizing:

$$D_{KL}(p,\pi_\theta)=CE(p,\pi_\theta)-H(p).$$

Distributional Policy Gradient approaches exploit the fact that, for any "proposal" distribution q whose support contains the support of p, there exists:

$$\nabla_\theta CE(p, \pi_\theta) = -\nabla_\theta E_{x\sim p}p(x)\log\pi_\theta(x) = -E_{x\sim p}p(x)\nabla_\theta \log\pi_\theta(x) = -E_{x\sim q}\frac{p(x)}{q(x)}\nabla_\theta \log\pi_\theta$$

where the last equality is an instance of importance sampling. The efficiency of the Distributional Policy Gradient approaches is related to how close the proposal q is to the target p (the limit where q is equal to p, the approach is identical to standard supervised training, but for the difference that the samples would be obtained directly from the underlying process p rather than from a training set of samples from p), and the algorithm is adaptive in the sense that it modifies q periodically to take advantage of the evolving approximations of the target language model $\pi_\theta$.

TABLE 1

Input: P, initial policy q
1:   $\pi_\theta \leftarrow q$
2:   for each iteration do TABLE 1-continued 3:   for each episode do
4:     sample x from q(_)
5:     $\theta \leftarrow \theta + \alpha^{(\theta)}\frac{P(x)}{q(x)}\nabla_\theta \log\pi_\theta(x)$
6:     if $\pi_\theta$ is superior to q then
7:       $q \leftarrow \pi_\theta$
Output: $\pi_\theta$ The pseudocode for Distributional Policy Gradient is given in Table 1, which takes as input the energy based model P, and a reference policy q which is a proxy to p; in this case q=a. During an iteration (e.g., minibatch or set of minibatches), a number of sequences from q are sampled, a Stochastic Gradient Descent update of θ (line 5) is performed, where P is used instead of p (noting that they only differ by a multiplicative constant), and where $\alpha^{(\theta)}$ is a learning rate. On lines 6 and 7, if the current target language model $\pi_\theta$ is closer to p than q (i.e.; it is superior to the reference policy), target language model $\pi_\theta$ is used as the new proposal.

In the implementation of the Distributional Policy Gradient approaches set forth in co-pending U.S. patent application Ser. No. 17/018,754, the quality of $\pi_\theta$ was assessed based on a comparison with an evaluation dataset related top.

While such a dataset does not exist here, there is a need to directly estimate the divergence from the underlying p which can be done by exploiting the following identity $$D_{KL}(p, \pi) = -\log Z + 1/Z E_{x\sim q(x)} \frac{P(x)}{q(x)} \log \frac{P(x)}{\pi(x)}.$$

In addition to methods set forth for generating a language model for text generation and using the generated model to generate text, the disclosed method concerns the use of the target language model outputted by said methods to generate text with a distribution of the target attributes that matches the expectation specified by the target constraints.

The disclosed method further concerns a computer program product comprising code instructions to execute these methods (particularly data processing means 12a, 12b of the servers 10a, 10b and the client equipment 12c, 12d, 12e) and use, and storage means readable by computer equipment (memory 13a, 13b, 13c, 13d, 13e) provided with this computer program product for storing such code instructions.

The disclosed method further concerns a language model controlling system comprising a processor configured to implement these methods of generating a language model for text generation and using the model to generate text.

Demonstration of the effectiveness of the disclosed method, along with implementation information, may be found in the article by M. Khalifa et al., entitled "A Distributional Approach to Controlled Text Generation" published on arXiv as arXiv:2012.11635v2, 2021, which is incorporated herein by reference.

Although the above embodiments have been described in the context of method steps, they also represent a description of a corresponding component, module, or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor. In a further embodiment, an apparatus comprises one or more processors and the storage medium mentioned above.

In a further embodiment, an apparatus comprises means, for example processing circuitry like e.g. a processor communicating with a memory, the means being configured to, or adapted to, perform one of the methods described herein.

A further embodiment comprises a computer having installed thereon the computer program or instructions for performing one of the methods described herein.

As described above, the method exploits a pre-trained language model a(x) (e.g., the autoregressive model GPT-2) in order to obtain a target language model p(x) satisfying target constraints. The obtained target language model p(x) is used for natural language text generation.

A method for generating a language model for text generation (a) receives a pre-trained language model having attributes with existing probability distributions over the pre-trained language model; (b) receives at least one target constraint; the target constraint specifying an expectation of a target attribute over a language model that approximates the pre-trained language model; (c) computing parameters of an energy based model by applying the target constraint to the pre-trained language model; (d) obtaining samples from a reference policy; (e) updating parameters of a target policy using the obtained samples and the energy based model; (f) updating the reference policy with the target policy if the target policy is superior to the reference policy; (g) repeating (d), (e) and (f) until the target policy converges with the target constraint; and (h) outputting the target policy as a target language model; wherein the target language model is adapted to generate text with the target attribute over a probability distribution that approximates the desired probability distribution specified by the target constraint.

The parameters of the target policy may be updated using a distributional policy gradient computed using the obtained samples and the energy based model.

The parameters of the target policy may be updated using a distributional policy gradient computed using the obtained samples and samples obtained from the energy based using a Monte Carlo method.

The target policy and the reference policy may be initialized with the pre-trained language model.

The target language model may be superior to the reference policy when the distance between the target policy and the implicit probability distribution represented by the energy based model is smaller than the distance between the reference policy and the implicit probability distribution represented by the energy based model.

The pre-trained language model may be an autoregressive model.

The pre-trained language model may be GPT-2.

The target constraint may be one of a pointwise constraint, a distributional constraint, and a hybrid constraint.

The target constraint may be a set of two or more constraints.

The target constraint may be a distributional constraint which is verified using a plurality of outputs from the reference policy.

The target language model may generate text with the target feature.

A computer program product non-transitorily existent on a computer-readable medium includes code instructions, when the computer program product is executed on a computer, to execute a method for generating a language model for text generation. The code instructions executes (a) receiving a pre-trained language model having attributes with existing probability distributions over the pre-trained language model, (b) receiving at least one target constraint; the target constraint specifying an expectation of a target attribute over a language model that approximates the pre-trained language model, (c) computing parameters of an energy based model by applying the target constraint to the pre-trained language model, (d) obtaining samples from a reference policy, (e) updating parameters of a target policy using the obtained samples and the energy based model, (f) updating the reference policy with the target policy if the target policy is superior to the reference policy, (g) repeating (d), (e) and (f) until the target policy converges with the target constraint, and (h) outputting the target policy as a target language model. The target language model is adapted to generate text with the target attribute over a probability distribution that approximates the desired probability distribution specified by the target constraint.

A non-transitory computer-readable medium, on which is stored a computer program product includes code instructions, when the computer program product is executed on a computer, to execute a method for generating a language model for text generation. The code instructions executes (a) receiving a pre-trained language model having attributes with existing probability distributions over the pre-trained language model, (b) receiving at least one target constraint; the target constraint specifying an expectation of a target attribute over a language model that approximates the pre-trained language model, (c) computing parameters of an energy based model by applying the target constraint to the pre-trained language model, (d) obtaining samples from a reference policy, (e) updating parameters of a target policy using the obtained samples and the energy based model, (f) updating the reference policy with the target policy if the target policy is superior to the reference policy, (g) repeating (d), (e) and (f) until the target policy converges with the target constraint, and (h) outputting the target policy as a target language model. The target language model is adapted to generate text with the target attribute over a probability distribution that approximates the desired probability distribution specified by the target constraint.

It will be appreciated that variations of the above-disclosed embodiments and other features and functions, and/or alternatives thereof, may be desirably combined into many other different systems and/or applications. Also, various presently unforeseen and/or unanticipated alternatives, modifications, variations, and/or improvements therein may be subsequently made by those skilled in the art which are also intended to be encompassed by the description above and the following claims.

What is claimed is:

1. A method for generating, from a pre-trained language model, a target language model for controlled text generation, the target language model having minimal divergence with pre-trained language model distribution, comprising:
    (a) receiving a pre-trained language model having attributes with existing probability distributions over the pre-trained language model;
    (b) receiving at least one target constraint, the received target constraint specifying an expectation of a target attribute over the target language model, the target language model approximating the pre-trained language model;
    (c) computing parameters of an energy based model by applying the received target constraint to the pre-trained language model;
    (d) obtaining samples from a reference policy;
    (e) updating parameters of a target policy using the obtained samples from the reference policy and the energy based model;
    (f) updating the reference policy with the target policy if a first distance between the target policy and an implicit probability distribution, the implicit probability distribution being represented by the energy based model, is smaller than a second distance between the reference policy and the implicit probability distribution represented by the energy based model, the first and second distances being calculated as a divergence;
    (g) repeating (d), (e) and (f) until the target policy converges with the target constraint; and
    (h) outputting the target policy as the target language model having minimal divergence with pre-trained language model distribution and configured to generate controlled text with the target attribute over a probability distribution approximating a probability distribution specified by the target constraint.

2. The method as claimed in claim 1, wherein the parameters of the target policy are updated using a distributional policy gradient computed using the obtained samples from the reference policy and the energy based model.

3. The method as claimed in claim 1, wherein the parameters of the target policy are updated using a distributional policy gradient computed using the obtained samples from the reference policy and samples obtained from the energy based model using a Monte Carlo method.

4. The method as claimed in claim 1, wherein the target policy and the reference policy are initialized with the pre-trained language model.

5. The method as claimed in claim 1, wherein the pre-trained language model is an autoregressive model.

6. The method as claimed in claim 1, wherein the pre-trained language model is GPT-2.

7. The method as claimed in claim 1, wherein the target constraint is one of a pointwise constraint, a distributional constraint and a hybrid constraint.

8. The method as claimed in claim 1, wherein the target constraint is two of a pointwise constraint, a distributional constraint and a hybrid constraint.

9. The method as claimed in claim 1, wherein the target constraint is a distributional constraint which is verified using a plurality of outputs from the reference policy.

10. The method as claimed in claim 1, wherein the target language model generates text with the target attribute.

11. The method as claimed in claim 1, wherein the divergence is calculated as a KL divergence.

12. A non-transitory computer-readable medium, on which is stored a computer program product comprising:
    code instructions, when the computer program product is executed on a computer, to execute a method for generating, from a pre-trained language model, a target language model for controlled text generation, the target language model having minimal divergence with distribution of the pre-trained language model;
    said code instructions executing
    (a) receiving a pre-trained language model having attributes with existing probability distributions over the pre-trained language model;
    (b) receiving at least one target constraint, the received target constraint specifying an expectation of a target attribute over the target language model, the target language model approximating the pre-trained language model;
    (c) computing parameters of an energy based model by applying the received target constraint to the pre-trained language model;
    (d) obtaining samples from a reference policy;
    (e) updating parameters of a target policy using the obtained samples from the reference policy and the energy based model;
    (f) updating the reference policy with the target policy if a first distance between the target policy and an implicit probability distribution, the implicit probability distribution being represented by the energy based model, is smaller than a second distance between the reference policy and the implicit probability distribution represented by the energy based model, the first and second distances being calculated as a divergence;
    (g) repeating (d), (e) and (f) until the target policy converges with the target constraint; and
    (h) outputting the target policy as the target language model having minimal divergence with pre-trained language model distribution and configured to generate controlled text with the target attribute over a probability distribution approximating a probability distribution specified by the target constraint.

13. The non-transitory computer-readable medium as claimed in claim 12, wherein the parameters of the target policy are updated using a distributional policy gradient computed using the obtained samples from the reference policy and the energy based model.

14. The non-transitory computer-readable medium as claimed in claim 12, wherein the parameters of the target policy are updated using a distributional policy gradient computed using the obtained samples from the reference policy and samples obtained from the energy based model using a Monte Carlo method.

15. The non-transitory computer-readable medium as claimed in claim 12, wherein the target policy and the reference policy are initialized with the pre-trained language model.

16. The non-transitory computer-readable medium as claimed in claim 12, wherein the pre-trained language model is an autoregressive model.

17. The non-transitory computer-readable medium as claimed in claim 12, wherein the pre-trained language model is GPT-2.

18. The non-transitory computer-readable medium as claimed in claim 12, wherein the target constraint is one of a pointwise constraint, a distributional constraint and a hybrid constraint.

19. The non-transitory computer-readable medium as claimed in claim 12, wherein the target constraint is two of a pointwise constraint, a distributional constraint and a hybrid constraint.

20. The non-transitory computer-readable medium as claimed in claim 12, wherein the target constraint is a distributional constraint which is verified using a plurality of outputs from the reference policy.

21. The non-transitory computer-readable medium as claimed in claim 12, wherein the target language model generates text with the target attribute.

22. The non-transitory computer-readable medium as claimed in claim 12, wherein the divergence is calculated as a KL divergence.

* * * * *